2 Sheets—Sheet 1.
A. T. THAYER.
Grain-Separators.
No. 210,372. Patented Nov. 26, 1878.
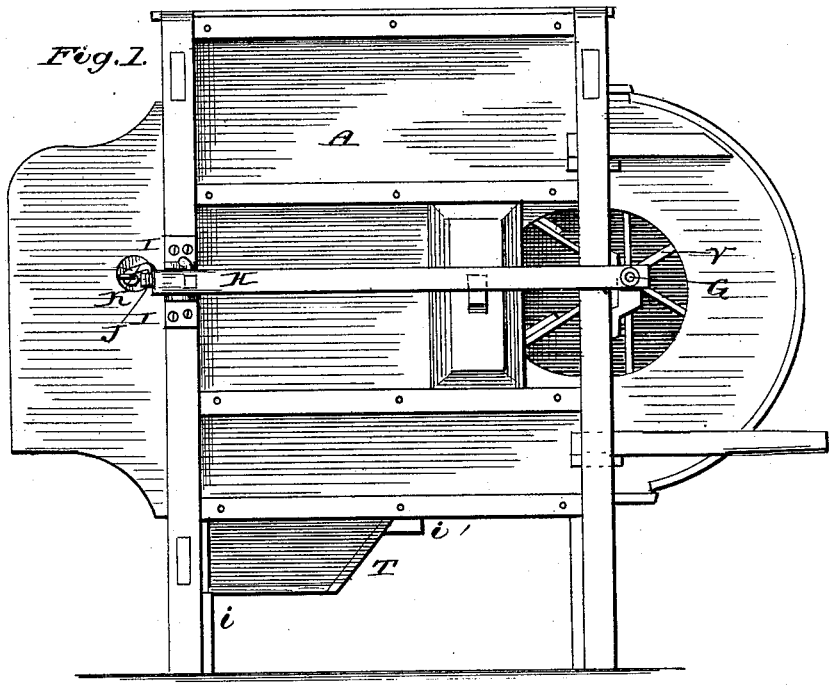
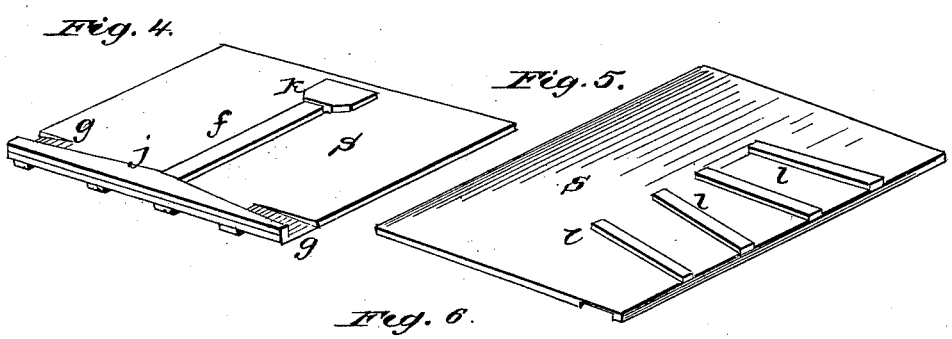
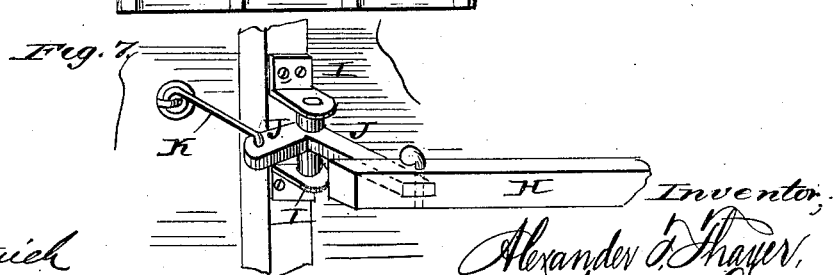
Witnesses.
Fred G. Dietrich
George Binkenburg
Inventor,
Alexander T. Thayer,
by Myers & Co.

A. T. THAYER.
Grain-Separators.

No. 210,372. Patented Nov. 26, 1878.

UNITED STATES PATENT OFFICE.

ALEXANDER T. THAYER, OF MILTON, INDIANA.

IMPROVEMENT IN GRAIN-SEPARATORS.

Specification forming part of Letters Patent No. 210,372, dated November 26, 1878; application filed August 31, 1878.

*To all whom it may concern:*

Be it known that I, ALEX. T. THAYER, of Milton, in the county of Wayne and State of Indiana, have invented certain new and useful Improvements in Fanning-Mills; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 2:
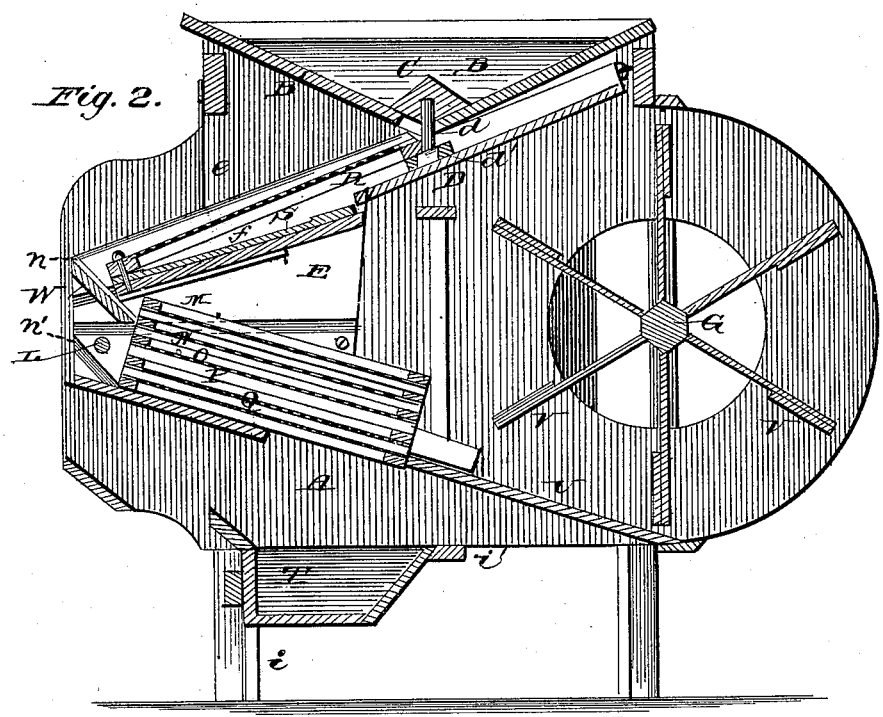
Figure 3:
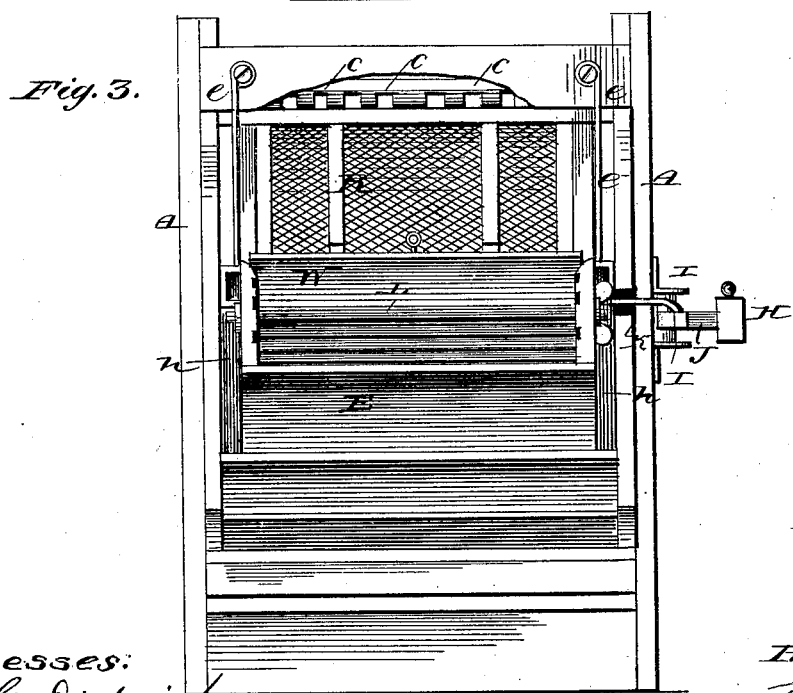

Figure 1 is a side elevation of my improved fanning-mill. Fig. 2 is a vertical section of the same. Fig. 3 is a transverse vertical section thereof. Fig. 4 is a detailed view of the chaff-board or incline. Fig. 5 is an inverted view thereof. Fig. 6 is a detailed view of the agitating or vibrating feeding device of the hopper, and Fig. 7 is a similar view of the shoe tail-gate.

The same part in the several figures is denoted by the same letter.

In the drawing, A refers to the inclosing-case of the respective parts of my mill, having the hopper B, with the removable side or slide B', for gaging the size of its feeding-opening. C is a vibrating feeding device, conical in transverse section, and provided with a series of cellular transverse passages or apertures, $c\,c$, opening downwardly and through either side, for the passage of the grain from the hopper in separate quantities, to prevent its clogging, the agitation of the feeder preventing it (the grain) from choking and adhering to the feeder while thus being fed to the upper sieve.

The agitating and feeding device receives its motion from the shoe when shaken, it being detachably secured to a stud, $d$, fastened to a bar, $d'$, screwed or otherwise removably connected to the shoe. An incline or board, D, is arranged in the shoe E, directly below and about in a line with the grain-feeding opening in the hopper, upon which the grain falls, or rather that portion of it escaping through the sieve above.

The shoe E is hung at its tail end from the inner sides of the case A by means of hooks $e\,e$, it being pivoted within said case at its forward end, to permit of its horizontal or lateral vibration, by means of the fan-shaft G, to which it is connected by the pitman or connecting-bar H, in turn connected to a crank on said shaft, and an angle-iron, J J, pivoted at its angle between and to cheek-plates I, fastened to case A, and having a single hole, into which is hooked a hook, K, of the shoe, said hook passing through an aperture in the side of the case A.

The shoe is provided along its sides with two opposite straight grooves and the same number of opposite short inclined grooves, $n\,n'$. The screen-threaded rod L is used to hold the several screens or sieves M N O P Q in the shoe, which screens vary in the size of their meshes, some finer and others coarser, to suit the kind or size of grain to be cleaned.

R is the uppermost sieve, fittting at its upper end directly under the hopper feed-opening, its lower end being pinned to the chaff-board S, adjusted in the inclined grooves in the shoe.

The chaff-board S is provided upon its upper side with a centrally-dividing bar, $f$, to separate the falling seed and other impurities, and insure the conducting of the same to the two discharging spouts or outlets $g\,g$ therefor, one on either side and at the lower end of the chaff-board, which empty their contents into downwardly-inclined spouts $h$, on each side of the shoe, the spouts $h$ emptying the chaff into the drawer or receptacle T below, slid in under the case A, upon a board set edgewise, $i$, fastened to the front legs of the case, and upon a flange, $i'$, fastened to the under side of the case.

The chaff is conducted, at the lower end of the board S, on each side of the central bar, $f$, to each of the outlets $g\,g$ therefor by means of a double-inclined strip or stop, $j$. At the upper end of the dividing-bar $f$ is another stop, $k$, which, when the chaff-board S is being slid home, will abut against the incline D at the proper point to bring the chaff-outlets $g$ in a line with the spouts $h$. The reverse or under side of the chaff-board S is provided with a number of bars, $l\,l$, which converge as they approach the edge of the board, as plainly shown in Fig. 5, the object of which is to spread the coarser grain falling thereon in chaffing, the board being reversed when that class of grain is to be cleaned. In cleaning clover this is the case.

In addition to this change the sieve adapted for cleaning clover is arranged with its tail or rear end resting on the rod L, and its other end resting upon the inwardly-projecting studs m.

U is the grain-board, secured to the under side of the case A, in such an inclined position as to direct the blast from the fan V directly into the contents of the sieves or screens, and thus thoroughly clean the same. This board is elevated sufficiently to permit of the placing thereunder a receptacle to catch the cleaned grain passing from the sieves or screens.

The uppermost sieve, R, is provided with an extended surface, comparatively, in either direction, to obtain the greatest possible amount of cleaning-surface.

W is the shoe tail-gate, to prevent the escape of the grain at that or the lower end of the shoe, and can be adjusted in either the grooves n, near the upper edge of the shoe, or in the grooves n', near its lower edge, to provide for either the lower or upper screens or sieves.

The inner side of the gate W is provided with strips or cross-pieces o o, to provide chutes or spaces between them and the lower ends of the screens or sieves for the downward passage of the grain.

The upper screen or sieve, R, is provided, as may be the other sieves or screens, with longitudinal partitions or ribs, to cause the dividing up or spreading over the same of the grain to be cleaned thereon.

Having thus fully described my invention, what I claim, and desire to secure by Letters Patent, is—

1. In a grain-separator, the reversible chaff-board S, having upon one side the strips $f$ and J, for the purpose of separating and conducting the falling chaff to the side discharge-outlets and spouts, said board being also provided upon its other side with a series of bars, $l$, converging, substantially as shown, and for the purposes herein described.

2. The herein-described vibrating feed and agitating device C, arranged to cover the opening at the bottom of the hopper, and being formed with a series of transverse passages, $c$, opening into and adapted to conduct the grain in suitable quantities from the hopper into the opening in its bottom, whereby the grain will be agitated and distributed, as herein set forth, in combination with the vibrating shoe and screen, substantially as shown and specified.

In testimony that I claim the foregoing as my own I affix my signature in presence of two witnesses.

ALEX. T. THAYER.

Witnesses:
H. W. SCHOPF,
PHILIP SHISSLER.